United States Patent
Jang et al.

(10) Patent No.: US 7,369,364 B2
(45) Date of Patent: May 6, 2008

(54) INTERCONNECT FOR DISSIPATING ELECTROSTATIC CHARGES ON A HEAD SLIDER

(75) Inventors: Eunkyu Jang, Santa Clara, CA (US); Hyung Jal Lee, Cupertino, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 552 days.

(21) Appl. No.: 10/750,638

(22) Filed: Dec. 19, 2003

(65) Prior Publication Data

US 2005/0135011 A1      Jun. 23, 2005

(51) Int. Cl.
   *G11B 5/17* (2006.01)
(52) U.S. Cl. .................... 360/234.5; 360/323
(58) Field of Classification Search ............ 360/234.6, 360/234.7, 234.8, 244.1, 245.9, 234.5
See application file for complete search history.

(56) References Cited

U.S. PATENT DOCUMENTS

| | | | |
|---|---|---|---|
| 7,006,331 B1 * | 2/2006 | Subrahmanyam et al. | 360/245.9 |
| 7,095,594 B2 * | 8/2006 | Maimone et al. | 360/244.1 |
| 2004/0070881 A1 * | 4/2004 | Wu et al. | 360/234.6 |
| 2004/0075946 A1 * | 4/2004 | Motonishi et al. | 360/234.6 |

FOREIGN PATENT DOCUMENTS

JP         2001216617 A  *  8/2001

* cited by examiner

*Primary Examiner*—Tianjie Chen
(74) *Attorney, Agent, or Firm*—Earle Jennings; GSS Law Group

(57) ABSTRACT

An interconnect that may reduce a head slider's exposure to electrostatic discharge events and may dissipate charging of the head is provided. Conductive and nonconductive adhesives are used to adhere a head slider to the interconnect. An electromagnetic interference generating circuit generates current that flows through the conductive adhesive bonding the head slider to the flexure arm. The electromagnetic interference current breaks down the resistance of the conductive adhesive to dissipate an electrostatic voltage charge on the head slider. This may prolong the life of the head slider and a read/write head coupled to the head slider.

6 Claims, 4 Drawing Sheets

INTERCONNECT FOR DISSIPATING ELECTROSTATIC CHARGES ON A HEAD SLIDER

BACKGROUND OF THE INVENTION

1. Field of the Invention

The present invention relates to a method and apparatus for dielectric breakdown of a conductive adhesive on a suspension interconnect of a hard disk drive to reduce the severity of electrostatic events encountered by a head slider coupled to the interconnect.

2. Background Information

Hard disk drives contain a plurality of magnetic heads that are coupled to rotating disks. The heads write and read information by magnetizing and sensing the magnetic fields of the disk surfaces. Typically the magnetic heads include a write element for magnetizing the disks and a separate read element for sensing the magnetic field of the disks. The read element is typically constructed using a magneto-resistive material that has a resistance that varies with the magnetic field of the disk. Heads with magneto-resistive read elements are commonly referred to as magneto-resistive (MR) and giant magneto-resistive (GMR) heads.

Each head is mechanically coupled to a head slider. The head slider is attached to a flexure arm to create a subassembly known as a head suspension assembly (HSA). The HSA comprises a subassembly of a known head gimbal assembly (HGA). The HGA's are attached to an actuator arm. The actuator arm has a voice coil motor that can move the heads across the surfaces of the disks.

Information is stored in radial tracks that extend across the surfaces of each disk. Each track is typically divided up into a number of segments or sectors. The voice coil motor and actuator arm can move the heads to different tracks of the disks and to different sectors of each track.

A suspension interconnect extends along the length of the flexure arm and connects the head to a preamplifier device of the voice coil motor. The suspension interconnect typically comprises a pair of conductive write traces and a pair of conductive read traces formed on a stainless steel lamina.

Changes in the geometry of the flexure may cause the read/write heads to contact the surface of the disk. If the read/write heads contact the surface of the disk, electrostatic charging may occur. The electrostatic discharge (ESD) that occurs when the head contacts the disk surface may jump to the head and may severely damage or destroy the head.

An electrostatic discharge may also be formed on the head during the build processes of the HSA, HGA, and hard disk drive. Each ESD event that the head is exposed to may significantly shorten the life of the head and head slider.

Accordingly, there exists a need for an interconnect design that may reduce the head and head slider's exposure to severe ESD events.

BRIEF SUMMARY OF THE INVENTION

The invention provides an interconnect that may reduce a head and head slider's exposure to electrostatic discharge (ESD) events and may dissipate electrostatic charging of the head. The invention may provide a reduced signal to noise ratio during data read/write operations. The invented interconnect allows electrostatic charges on the head to flow to a preamplifier circuit to provide low resistance between the head and suspension. This may minimize variations of the flying height of the head over the surface of a rotating disk.

The invented interconnect includes conductive and non-conductive adhesives that are used to bond the head slider to a flexure arm of the interconnect. An electromagnetic interference (EMI) generating circuit generates current that flows through the conductive adhesive bonding the head slider to the flexure arm. The EMI current breaks down the resistance of the conductive adhesive to dissipate electrostatic charges on the head slider. This may limit the head slider's exposure to severe ESD events, which may prolong the life of the head.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes presently contemplated by the inventors of carrying out the invention. Various modifications, however, will remain readily apparent to those skilled in the art, since the generic principles of the present invention have been defined herein. The invention includes an improved interconnect for a flexure arm of a hard disk drive, the invention provides an interconnect that may reduce a head and head slider's exposure to severe electrostatic discharge (ESD) events and may dissipate electrostatic voltage charges on the head. The invention may provide an increased signal to noise ratio during data read/write operations. The invention may also minimize variations of the flying height of the head slider over the surface of a rotating disk.

The invented interconnect includes conductive and non-conductive adhesives that are used to bond the head slider to a flexure arm. A circuit, which may be an electromagnetic interference (EMI) generating circuit, generates current that flows through the conductive adhesive bonding the head slider to the flexure arm. This current may break down the resistance of the conductive adhesive to dissipate the electrostatic charge on the head and head slider. This may prolong the life of both the head and head slider.

Figure 1:
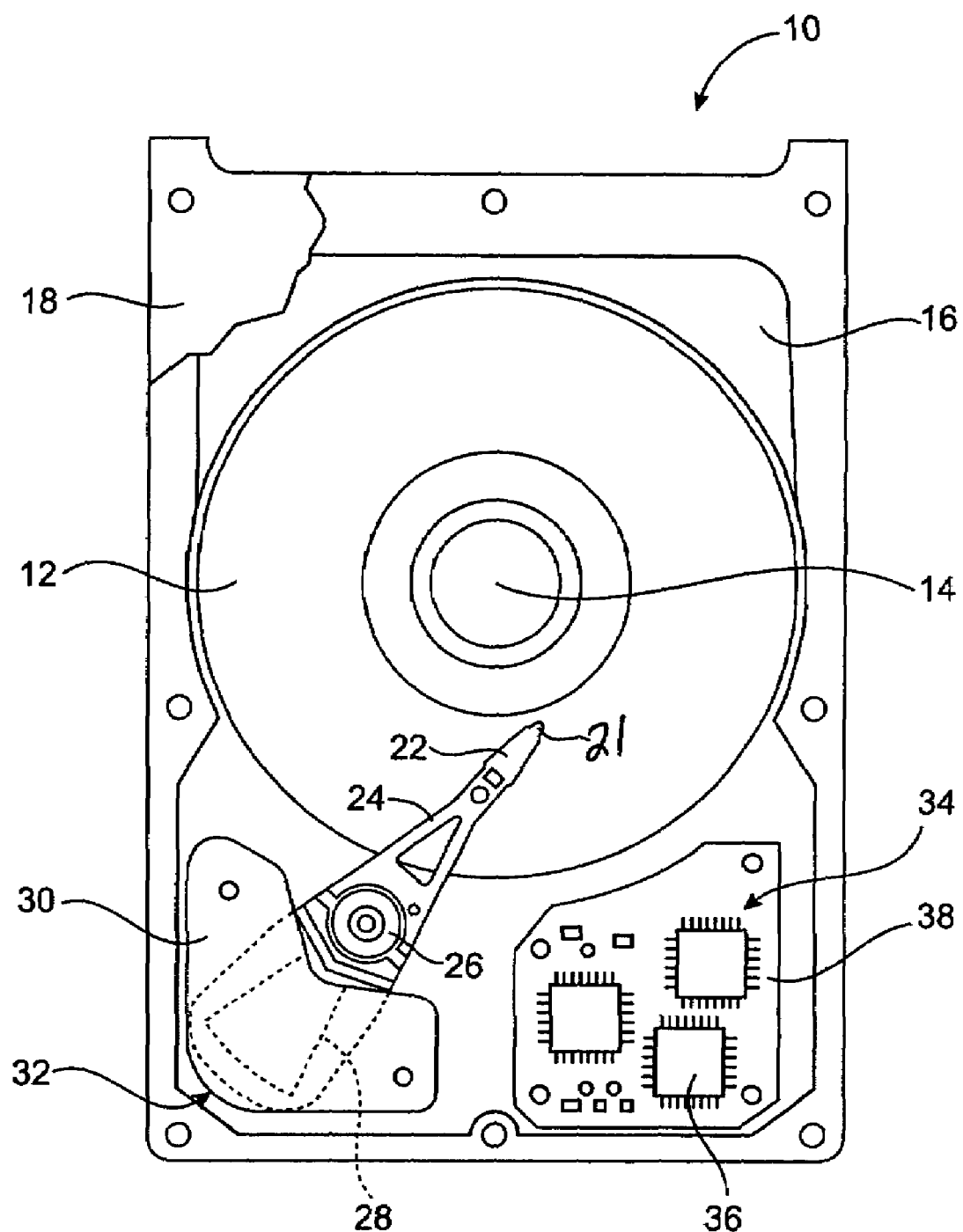
FIG. 1 is a top view of an embodiment of a hard disk drive of the invention.

Referring to the drawings, more particularly by reference numbers, FIG. 1 shows an embodiment of a hard disk drive 10 of the present invention. The hard disk drive 10 may include one or more magnetic disks 12 that are rotated by a spindle motor 14. The spindle motor 14 may be mounted to a base plate 16 of the drive 10. The disk drive 10 may further include a cover 18 that encloses the disks 12.

The disk drive 10 may include a plurality of heads 20 coupled to head sliders 21. Each head 20 is located adjacent to a rotating disk 12. Each head 20 may have separate write and read elements (both not shown) that magnetize and sense the magnetic fields of the disks 12.

Each head slider 21 may be gimbal mounted to a flexure arm, or flexure, 22 to form a head gimbal assembly (HGA). The flexure 22 comprises the invented interconnect. The flexure 22 is attached to an actuator arm 24 that is pivotally mounted to the base plate 16 by a bearing assembly 26. A voice coil 28 is coupled to a magnet assembly 30 to create a voice coil motor (VCM) 32. Providing a current to the voice coil 28 creates a torque that swings the actuator arm 24 and moves the heads 20 across the surfaces of the disks 12.

The disk drive 10 may further include a printed circuit board assembly 34. The printed circuit board assembly 34 may include a plurality of integrated circuits 36 coupled to a printed circuit board 38. The printed circuit board 38 is coupled to the voice coil 28, heads 20, and spindle motor 14 by wires (not shown).

Figure 2:
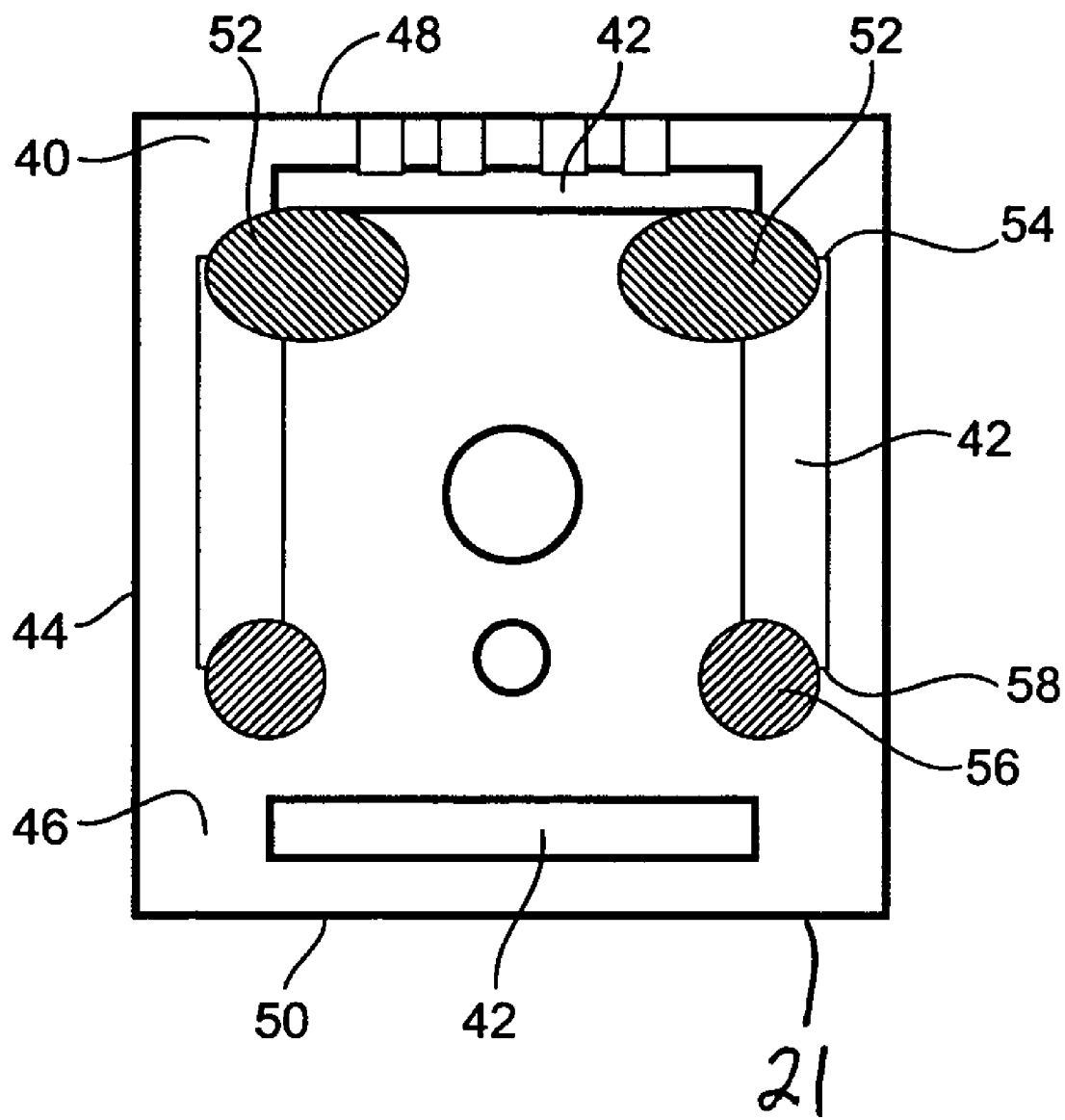
FIG. 2 is an enlarged bottom view of a head slider of the invention.
Figure 3:
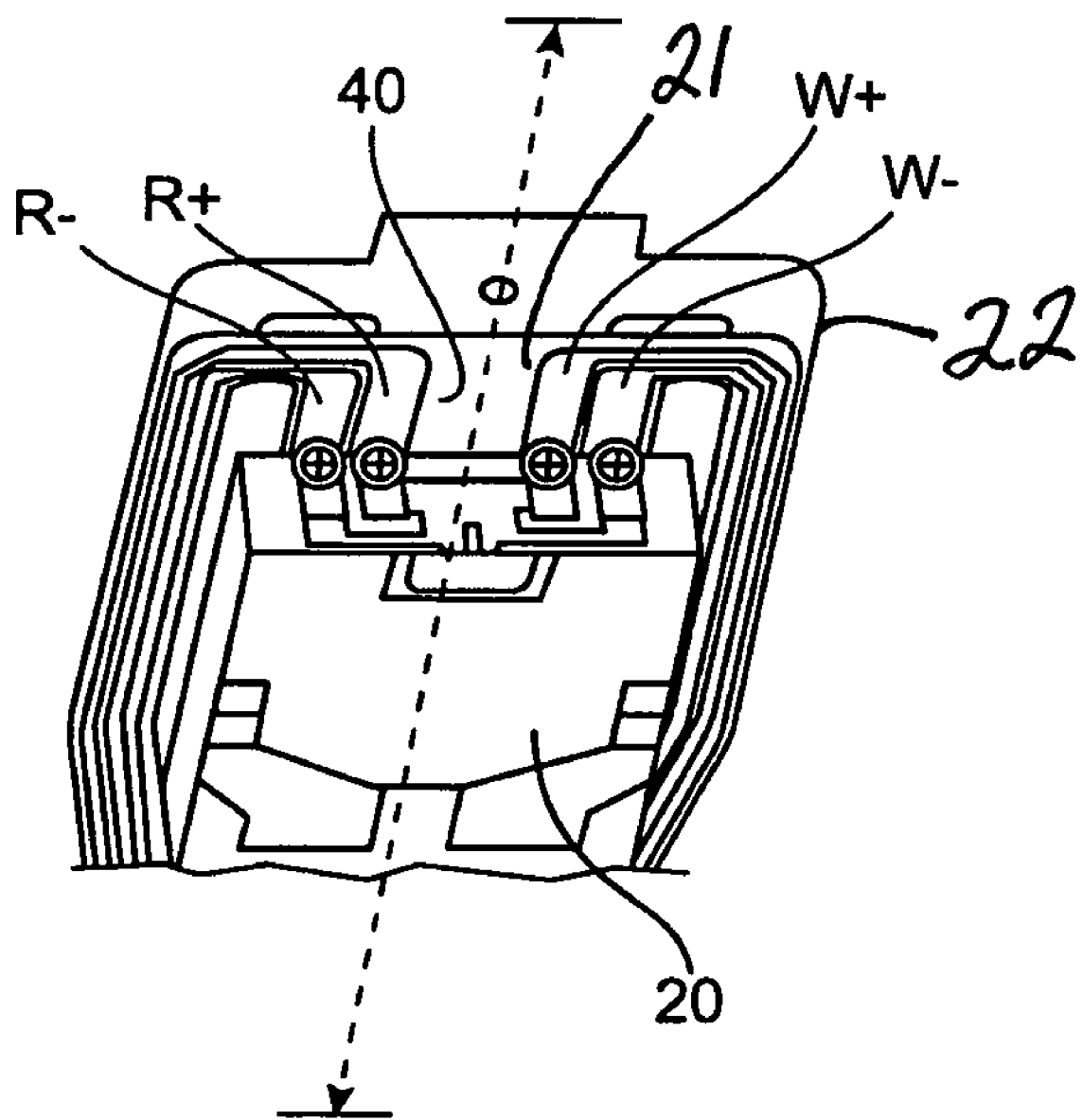
FIG. 3 is an enlarged view of a head slider coupled to the flexure arm.

As shown in FIG. 2 and FIG. 3, pair of conductive write traces W+, W− and a pair of conductive read traces R+, R− extend along the flexure 22, over the head slider 21, and couple to the head 20. The traces are formed on a stainless steel lamina 40. The stainless steel lamina 40 may be formed using known methods.

A ridge 42 may be formed along each side 44 of an underside 46 of the head slider 21. A ridge 42 may also be formed adjacent to a front edge 48 of the head slider 21 and adjacent a rear portion 50 of the head slider 21. The ridges 42 may be configured to form a base for supporting a head 20 that is secured to the head slider 21. The ridges 42 may comprise any suitable tough, durable polymeric material. By way of example, the ridges 42 comprise polyimide and are formed using known methods.

An adhesive, such as epoxy, may be used to secure the head 20 to the head slider 21. The adhesive may comprise either conductive epoxy, or non-conductive epoxy, or both. The adhesive is applied to the head slider 21 using known methods. The head 20 is positioned on the adhesive to affix the head 20 to the head slider 21.

By way of example, a deposition of non-conductive adhesive 52 may be disposed on the stainless steel lamina 40 adjacent each corner of the front edge 48 of the head slider 21. A portion of each deposition of non-conductive adhesive 52 may extend over a front end 54 of the adjacent ridge 42. The non-conductive adhesive 52 may be elliptical in cross-sectional configuration. The non-conductive adhesive 52 may comprise non-conductive epoxy. By way of example, the impedance of the non-conductive adhesive 52 may range from approximately 3 KΩ to approximately 12 MΩ.

Similarly, a deposition of conductive adhesive 56 may be disposed on the stainless steel lamina 40 adjacent each corner of the rear portion 50 of the head slider 21. A portion of each deposition of conductive adhesive 56 may extend over a rear end 58 of the adjacent ridge 42. The conductive adhesive 56 may be substantially circular in cross-sectional configuration. The conductive adhesive 56 may comprise conductive epoxy.

The breakdown voltage of the conductive adhesive 56 may vary depending upon material comprising the adhesive, such as epoxy, the quantity of adhesive, and shape of the deposition of adhesive. Preferably, the breakdown voltage of the conductive adhesive 56 ranges between 1 and 5 volts. The dielectric breakdown of the conductive adhesive 56 results in a low resistance thereof. The impedance of the conductive adhesive 56 may be less than approximately 50 ohms. Preferably, the impedance of the conductive adhesive 56 ranges from approximately 10 ohms to approximately 20 ohms. Thus, each deposition of conductive adhesive 56 may be capable of providing a current path between the head 20, head slider 21, and flexure 22 to reduce the voltage potential between the head 20 and flexure 22.

Figure 4:
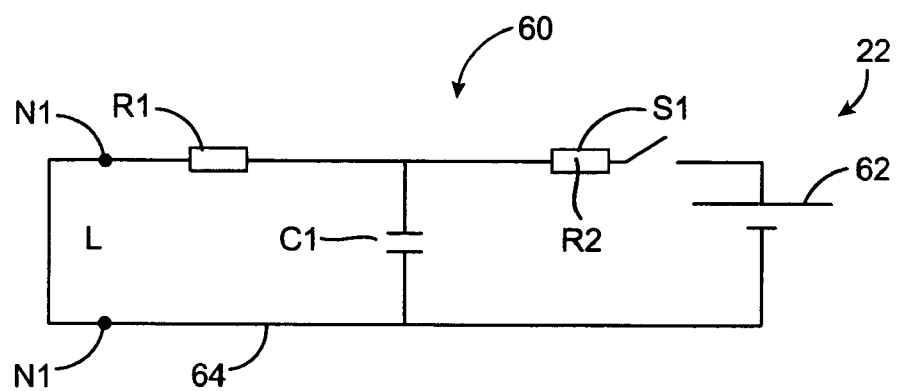
FIG. 4 and FIG. 5 are schematic diagrams showing a circuit that generates current for dissipating electrostatic voltage on a head slider of the invention.
Figure 5:
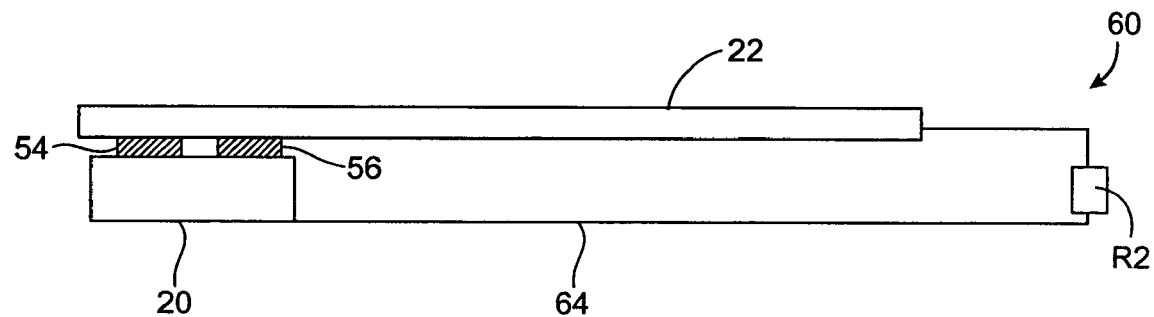

As shown in FIG. 4 and FIG. 5, a circuit, shown schematically only, at 60, is provided to generate electrical current that flows through the depositions of conductive adhesive 56 that bond the head to the head slider 21. It is to be understood that the circuit 60 may be formed on the flexure 22 as is known in the art.

The circuit 60 may comprise an electromagnetic interference (EMI) generating circuit. The circuit 60 is capable of generating sufficient electrical current to breakdown the resistance of the conductive epoxy 56 to dissipate electrostatic voltage on the head 20. Preferably, the circuit 60 may be capable of generating current between 1 and 5 milliamps of current.

The circuit 60 may include a pair of resistors R1, R2 that are coupled in series. A capacitor or inductor C1 may be coupled in parallel with resistor R2 and coupled to ground 62. A switch S1 may be provided between resistor R2 and ground 62. The circuit 60 may be electro-magnetically coupled to the head 20 across node N1, for coupling the circuit 60 to the head 20. A conductor 64, such as a wire, may be secured to the head 20 and coupled to ground 62 for completing the circuit 60. The conductor 64 may also be coupled to resistor R2 to provide a current path between the head 20 and resistor R2.

When it is desired to dissipate an electrostatic voltage charge on the head 20, the switch S1 is closed. Closure of the switch SI allows current to flow from the head 20 to ground 62 to dissipate voltage on the head. Closure of the switch S1 may be performed during manufacture the hard disk drive 10. Closure of the switch S1 may be momentary. The switch S1 may be repeatedly opened and closed to dissipate electrostatic voltage on the head 20.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A head gimbal assembly (HGA) for a hard disk drive (10), comprising:
   a flexure (22);
   a head slider (21) mounted on the flexure (22) and including a stainless steel lamina (40) with a front edge (48), a side (44), and a rear (50), and providing for a read pair (R−, R+) and a write pair (W−, W+) of electrical connections;
   a group of dielectric-material ridges (42) disposed on said stainless steel lamina (40), and set orthogonal to one another along the side (44), front (48), and rear (50) edges, all on an underside (46) of the head slider (21);
   a pair of dabs (52) of non-conductive epoxy generally disposed in the gaps between the front and side ones of the group of dielectric-material ridges (42) near said front edge (48), and having an electrical resistance in the range of 3K to 12M ohms;
   a pair of dabs (56) of conductive epoxy generally disposed in the gaps between the rear and side ones of the group of dielectric-material ridges (42) near said rear edge (50), and having an electrical resistance of less than fifty ohms, and subject to dielectric breakdown when impressed with 1-5 volts; and a read-write head (20) insulatively supported by the group of dielectric-material ridges (42), and structurally attached to the head slider (21) by the pair of dabs (52) of non-conductive epoxy, and grounded for electrostatic protection by the pair of dabs (56) of conductive epoxy;

wherein, such construction reduces the head and the slider's exposure to severe electrostatic discharge (ESD) events and dissipates electrostatic voltage charges on the head.

2. The HGA of claim 1, further comprising:

a discharging circuit (60) for generating a current flow through the pair of dabs (56) of conductive epoxy to break down the dielectric resistance of the conductive epoxy, wherein electrostatic charge on the read-write head (20) and head slider (21) will thereafter be dissipated to prolong their service lives.

3. The HGA of claim 2, further comprising:

means for the discharging circuit (60) to produce 1-5 milliamps of current through the pair of dabs (56) of conductive epoxy.

4. The HGA of claim 2, further comprising:

means for the discharging circuit (60) to be electromagnetically coupled to the read-write head (20).

5. The HGA of claim 2, further comprising:

means for the discharging circuit (60) to be switched on that will then dissipate an electrostatic voltage charge on the read-write head (20).

6. The HGA of claim 2, further comprising:

means for switching on the discharging circuit (60) during manufacture of the HGA that will then dissipate an electrostatic voltage charge on the read-write head (20).

\* \* \* \* \*